(12) United States Patent
Guler et al.

(10) Patent No.: US 7,844,535 B2
(45) Date of Patent: Nov. 30, 2010

(54) COMPUTER-IMPLEMENTED METHOD FOR DETERMINING A BID FOR AN AUCTION

(75) Inventors: Kemal Guler, Cupertino, CA (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2211 days.

(21) Appl. No.: 10/279,307

(22) Filed: Oct. 23, 2002

(65) Prior Publication Data

US 2004/0083154 A1 Apr. 29, 2004

(51) Int. Cl.
*G06Q 40/00* (2006.01)
(52) U.S. Cl. ....................................................... 705/37
(58) Field of Classification Search ................... 705/37
See application file for complete search history.

(56) References Cited

U.S. PATENT DOCUMENTS

| 7,096,197 B2 * | 8/2006 | Messmer et al. ............... 705/37 |
| 2002/0174052 A1 * | 11/2002 | Guler et al. .................... 705/37 |

OTHER PUBLICATIONS

Acadecic Press Dictionary of Science and Technology, 1992.*
Zhang, Zhang, and Chung, Assisting Seller Pricing Strategy Section for Electronic Auction, Jul. 2004.*
Waehrer, Harstad, and Rothkopf, Auction from perferences of risk-averse bid takers, spring 1998, RAND Journal of Economics.*
Campo, S., et al., "Asymmetry in First-Price Auctions with Affiliated Private Values", *Journal of Applied Econometrics*, (Jan. 14, 2003),179-207.
Klemperer, Paul "Auction Theory: A Guide to the Literature", *Journal of Economic Surveys*, (Mar. 1999),1-95.
Li, T., et al., "Structural Estimation of the Affiliated Private Value Auction Model", *RAND Journal of Economics*, (2002),171-193.
McAfee, R.P., et al., "Auctions and Bidding", *Journal of Economic Literature*, (Jun. 1987),699-738.
Milgrom, P.R., et al., "Econometrica: A Theory of Auctions and Competitive Bidding", *Econometrica*, (Sep. 1982),1089.
Paarsch, Harry J., "Deriving an Estimate of the Optimal Reserve Price: An Application to British Columbian Timber Sales", *Journal of Econometrics*, (1997),333-357.
Silverman, B.W. "Density Estimation for Statistics and Data Analysis", *School of Mathematics*, 90-98.
Wilson, Robert "Strategic Analysis of Auctions", *Handbook of Game Theory with Economic Application*, (May 1990),1-64.

* cited by examiner

*Primary Examiner*—Alexander Kalinowski
*Assistant Examiner*—Chuks Onyezia (57) ABSTRACT

A computer-implemented method for determining a bid for a auction. A valuation for the auction, a risk preference, and a rate of change of the risk preference are received. A joint distribution is determined based on historical auction information and at least one updated valuation for an historical auction. A density of the joint distribution is determined. The bid is determined based on the risk preference, the rate of change of the risk preference, the valuation, the joint distribution, and the density of the joint distribution.

22 Claims, 7 Drawing Sheets

410
Generate a two column matrix wherein a row represents one historical auction, a first column comprises the maximum historical rival bid and a second column comprises the updated valuation.

420
Perform a non-parametric estimation on the two column matrix.

| | 510 Maximum Historical Bid | 520 Updated Valuation |
|---|---|---|
| 1 | 18 | 15 |
| 2 | 21 | 18 |
| 3 | 22 | 22 |
| 4 | 23 | 23 |
| ⋮ | | |
| $n$ | 23 | 23 |

530 Historical Auction

Figure 7

COMPUTER-IMPLEMENTED METHOD FOR DETERMINING A BID FOR AN AUCTION

FIELD OF INVENTION

Various embodiments of the present invention relate to the field of auction decision analysis.

BACKGROUND OF THE INVENTION

A sealed bid first price auction requires bidders to submit bids in a sealed envelope, or in an electronic equivalent of a sealed envelope, such that all bids are kept secret from rival bidders and each bidder only gets one bid. The highest bidder (or the lowest bidder in the instance of a procurement auction) is deemed the winner. A bidder participating in a sealed bid first price auction must make a number of decisions when determining a bid. In order to assist a bidder in determining their optimal bid, various tools have been developed for analyzing a particular market environment.

In game theoretic approach, auctions are modeled as games of incomplete information played by Bayesian players. Basic elements of models of auctions-as-games include a set of bidders, a set of types for each bidder representing the bidder's private information, and a set of conditional probabilities representing the bidder's beliefs about rival bidders' types conditional on his/her own type.

In game theoretic approach, the joint distribution of bidders' valuations is taken as a key structural element of the auction environment. All the theoretical results—bidding behavior, comparison of alternative auction mechanisms, etc.—are expressed in terms of the joint value distribution. However, in practice the key structural elements of the auction environment are unobservable. As such, the usefulness of current bid determination tools is limited. To overcome this shortcoming, it has been proposed to express the results of the bid determination in terms of the joint bid distribution in working with the historical bidding data.

This approach, however, maintains Nash equilibrium behavior on the part of the bidders as an assumption. By the very same assumption, all the observed bids in the sample of auctions analyzed by the econometrician are treated as equilibrium bids. In particular, the informational assumptions of the game model are taken as starting point. That is, the structural elements of the game are unknown only to the econometrician analyzing the data, but not to the bidders or the seller. As far as the bidders are concerned, they are assumed to know the joint distribution of all valuations. Furthermore, being Bayesians, the bidders correctly guess the rival bidders' bidding behavior.

Provided such strong informational assumptions are maintained, other considerations necessitate even stronger assumptions—such as symmetry, risk neutrality—to render equilibrium approach applicable in situations with practically realistic sample sizes and data structures.

Currently, a typical bidder's model of the bidding environment features the details typically assumed in game theoretic equilibrium analysis of auctions. In particular, a bidder makes a number of assumptions, including but not limited to how rival bidders' valuations are determined, what bidding strategies rival bidders adopt, what the risk attitudes of rival bidders are, and how many rival bidders may participate in the auction.

Current tools for determining an optimal bid in a sealed bid first price auction analyze bid data from historical auctions. The historical bid data is used to determine the probability of winning the auction given alternate bid amounts. However, in order to determine the bid amounts, a number of assumptions are relied on. In particular, it is commonly assumed that the bidders' valuations, and hence, their bids, are independent of each other. In essence, it is assumed that a bidder will not change their bid if the bidder becomes aware of the bid of another bidder or bidders. Making conclusions relying on the independence assumption provides less reliable bid information, and may lead to an incorrect bid strategy.

Current methods for determining an optimal bid in a first bid sealed price auction have substantial drawbacks. One class of methods provide solutions that are theoretical, and are not suited for practical use. Furthermore, other methods require the use of broad assumptions to determine the bidders' valuations, thus limiting the applicability and reliability of the results.

SUMMARY OF THE INVENTION

Various embodiments of the present invention, a computer-implemented method for determining a bid for an auction, are presented. A valuation for the auction, a risk preference, and a rate of change of the risk preference are received. A joint distribution is determined based on historical auction information and at least one updated valuation for an historical auction. A density of the joint distribution is determined. The bid is determined based on the risk preference, the rate of change of the risk preference, the valuation, the joint distribution, and the density of the joint distribution.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a computer-implemented method for determining a bid for an auction, are described herein. In one embodiment, the present invention provides a method for determining a bid for an auction based on historical bids recorded from historical auctions for a similar item and on updated valuations of the historical auctions. In one embodiment, the present invention utilizes the joint distribution of the maximum historical rival bids from historical auctions and the updated valuations to determine the bid. The bid may be used in placing a bid on the auction.

It should be appreciated that embodiments of the present invention are applicable to all auction formats (e.g., forward auctions and procurement auctions). For purposes of the present application, examples are given for the instance of a forward auction. Someone with average skill in the art can make the appropriate modifications of the described embodiments for use in a procurement auction. For example, in the case of a supplier bidding to sell an item, the phrase "the maximum historical rival bid" should be replaced with "the minimum historical rival bid".

Figure 1:
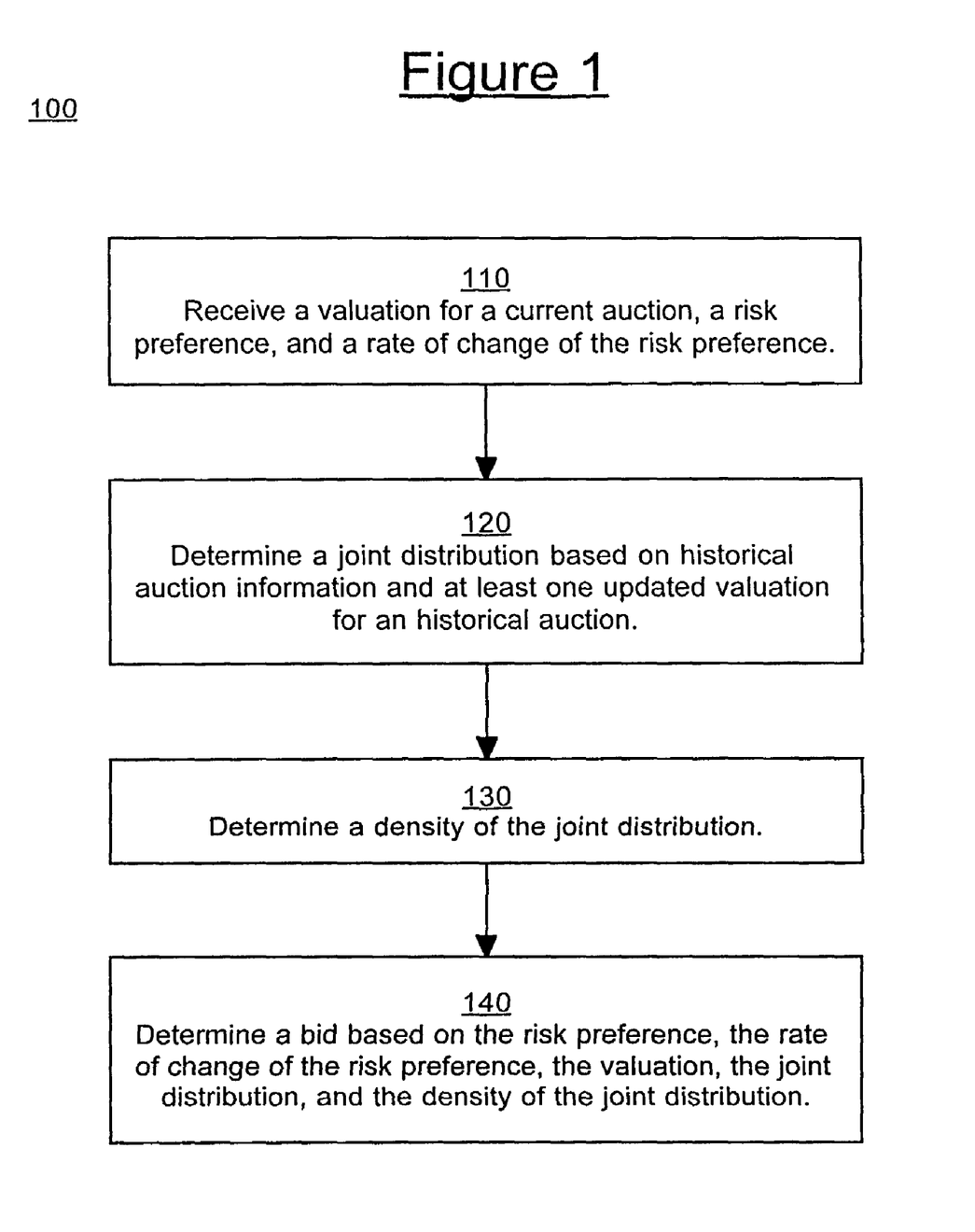
FIG. 1 is a flow chart illustrating steps in a process for determining a bid for an auction in accordance with one embodiment of the present invention.

FIG. 1 is a flow chart illustrating steps in a process for determining a bid for an auction in accordance with one embodiment of the present invention. In one embodiment, process 100 is carried out by processors and electrical components under the control of computer readable and computer executable instructions. Although specific steps are disclosed in process 100, such steps are exemplary. That is, the embodiments of the present invention are well suited to performing various other steps or variations of the steps recited in FIG. 1.

At step 110, information pertaining to an auction and a bidder is received. In one embodiment, a valuation for the auction is received, as well as a risk preference for the bidder and a rate of change of the risk preference. In one embodiment, the auction is a sealed bid first price auction for a single indivisible item. In one embodiment, the bidder's valuation of the item is private, such that the bidder does not revise valuation $v_i$ if the valuations of rival bidders becomes known. For purposes of the present application, the bidder's monetary valuation of the item is denoted by $v_i$.

In one embodiment, the bidder's risk preference (e.g., attitude towards risk) is formalized by a concave von Neumann-Morgenstern (vNM) utility of wealth function $u_i(w)$ that associates a utility level $u_i(w)$ with wealth level w. The vNM utility function is normalized so that $u_i(0)=0$ and $u_i(w_0)=w_0$ for some wealth level $w_0>0$. Valuation $v_i$ represents the bidder's maximum willingness to pay for the item. Winning the item with a payment of $b_i$ yields a profit equal to $v_i-b_i$ and a utility level equal to $u_i(v_i-b_i)$. In one embodiment, the rate of change of the risk preference is determined by taking the derivative of the risk preference utility.

In one embodiment, the information pertaining to the auction does not include risk preference and the rate of change of risk preference. Instead, the user provides valuations for the items in the historical auctions and the current auction. In the present embodiment, the present invention is used to calculate the risk-return profiles of alternative bid amounts. For example, based on the estimates of the functions $H_{B_i,v_i}(b_i^*, v_i)$ and $h_{B_i,v_i}(b_i^*, v_i)$ one can calculate the mean return and the variance of the return associated with a plurality of alternative bid amounts. The user, then, can select from among the alternative bid amounts the bid amount that fits his/her risk-return preferences best, without having to submit his risk-return preferences in any specific language or any specific format.

Figure 2:
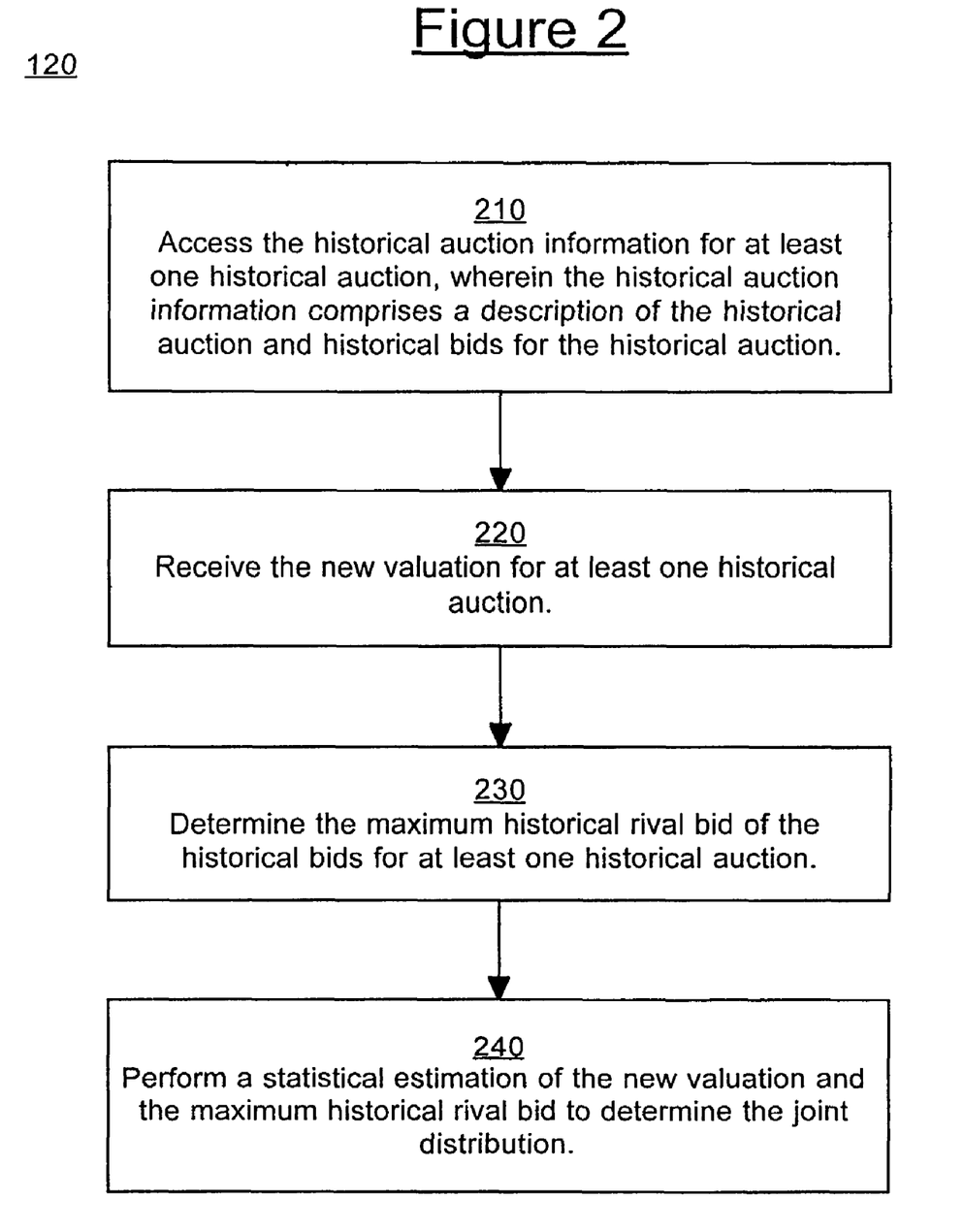
FIG. 2 is a flow chart illustrating steps in a process for determining a joint distribution in accordance with one embodiment of the present invention.

At step 120, a joint distribution is determined based on historical auction information and at least one updated valuation for an historical auction. It should be appreciated that the historical auctions of the historical auction information are for an item similar to the item of the auction. FIG. 2 is a flow chart illustrating steps in a process 120 for determining a joint distribution in accordance with one embodiment of the present invention.

At step 210 of process 120, historical auction information for at least one historical auction is accessed. In one embodiment, the historical auction information comprises a description of the historical auction and historical bids for the historical auction. It should be appreciated that there may be any number of historical auctions, wherein the historical auctions may comprise any number of historical bids. In one embodiment, the historical auction information is presented as a matrix of historical bid data.

Figure 3A:
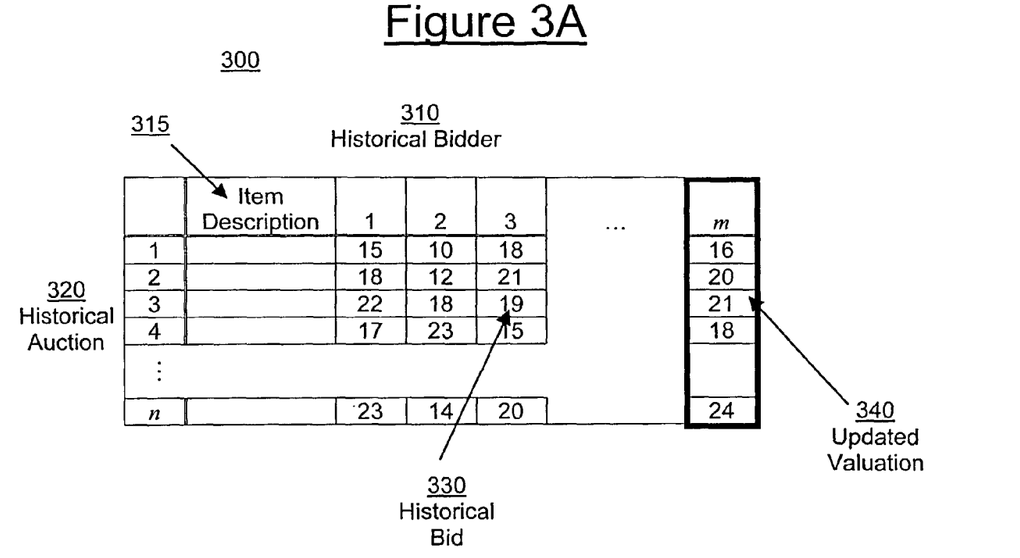
FIG. 3A is a diagram of an exemplary matrix of historical bid data comprising a column of updated valuations in accordance with one embodiment of the present invention.
Figure 3B:
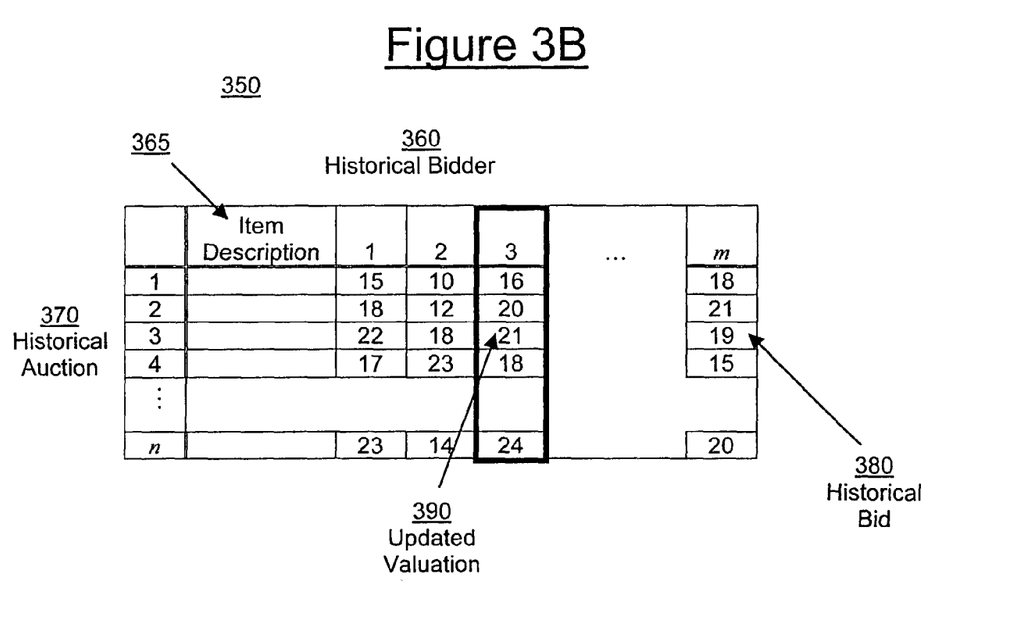
FIG. 3B is a diagram of an exemplary matrix of historical bid data wherein historical bids for a particular bidder are replaced with updated valuations in accordance with one embodiment of the present invention.

FIG. 3A is a diagram of an exemplary matrix 300 of historical bid data in accordance with one embodiment of the present invention. Matrix 300 comprises a plurality historical bids 330 for a plurality of historical bidders 310 and a plurality of historical auctions 320. In one embodiment, matrix 300 comprises an item description 315 for each historical auction 320. FIG. 3B is a diagram of an exemplary matrix 350 of historical bid data in accordance with another embodiment of the present invention. Matrix 350 comprises a plurality historical bids 380 for a plurality of historical bidders 360 and a plurality of historical auctions 370. In one embodiment, matrix 350 comprises an item description 365 for each historical auction 370. It should be appreciated that matrices 300 and 350 may comprise any number of historical bids, historical auctions, and historical bidders, and is not limited to the present embodiments as illustrated in FIGS. 3A and 3B With reference to FIG. 2, at step 220, an updated valuation is received for at least one historical auction. For an historical auction, the bidder creates an updated valuation for the item sold. It should be appreciated that the updated valuation can be any value and be based on any information. In one embodiment, the bidder creates the updated valuation based information not available at the time of the historical auction. In one embodiment, the updated valuations are entered a matrix (e.g., matrix 300 of FIG. 3A).

In one embodiment, where the bidder was not a participant in the historical auctions, a new column is added to the matrix for the updated valuations. Matrix 300 of FIG. 3A illustrates a column of updated valuations 340 in accordance with the present embodiment. In another embodiment, where the bidder was a participant in the historical auctions, the historical bids of the bidder are replaced with the updated valuations. Matrix 350 of FIG. 3B illustrates replacing the historical bids of a bidder with updated valuations 390 in accordance with the present embodiment. For example, bidder 3 of the historical auctions is the bidder performing a method for determining a bid (e.g., method 100 of FIG. 1). In this instance, the historical bids 380 for bidder 3 are replaced with updated valuations 390.

With reference to FIG. 2, at step 230, the maximum historical rival bid of the historical bids for at least one historical auction is determined. For example, consider matrix 300 of FIG. 3A. In auction 1, the historical bids 330 are 15 for bidder 1, 10 for bidder 2, and 18 for bidder 3. As such, 18 is the maximum bid for auction 1. In one embodiment, step 230 is performed for every historical auction provided in the historical auction information.

Figure 4:
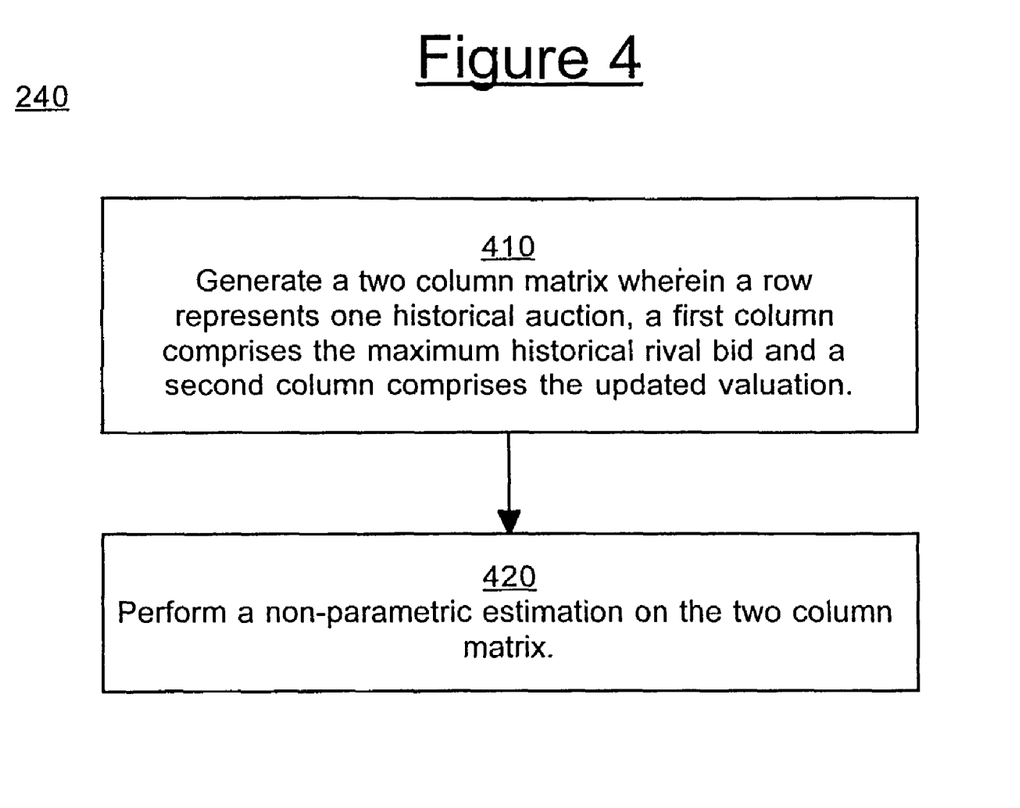
FIG. 4 is a flow chart illustrating steps in a process for performing a statistical estimation in accordance with one embodiment of the present invention.

At step 240, a statistical estimation of the updated valuation and the maximum historical rival bid is performed to determine the joint distribution. FIG. 4 is a flow chart illustrating steps in a process 240 for performing a statistical estimation in accordance with one embodiment of the present invention. At step 410 of process 240, a two-column matrix is generated. In one embodiment, a row of the matrix represents one historical auction, a first column comprises the maximum historical rival bid and a second column comprises the updated valuation.

Figure 5:
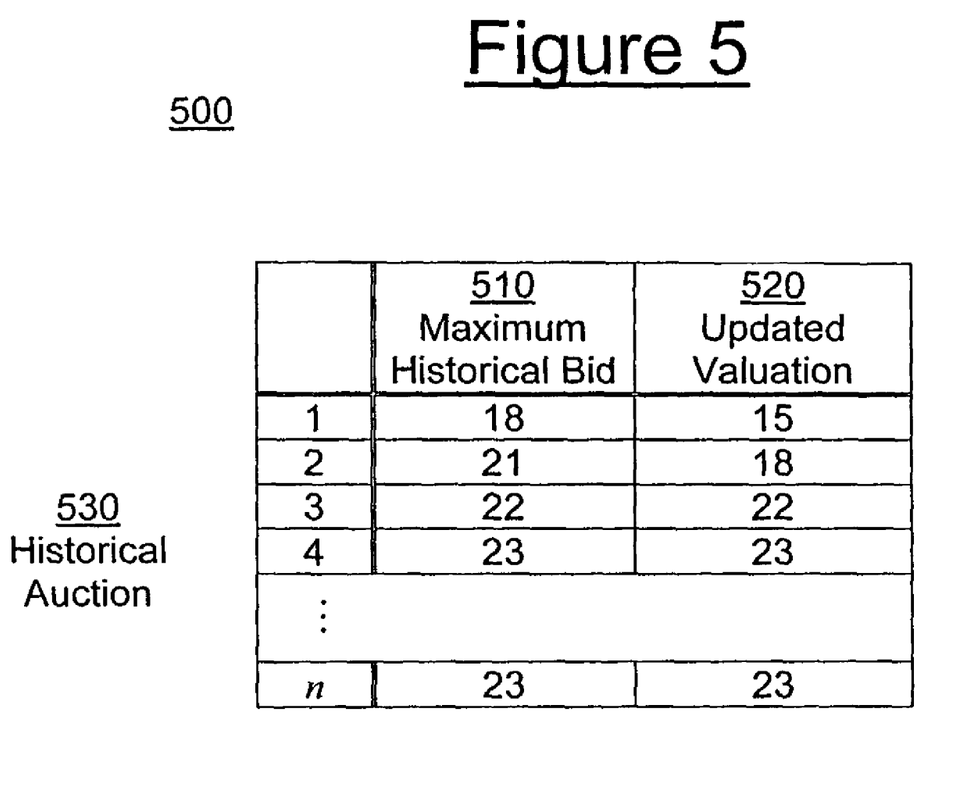
FIG. 5 is a diagram of an exemplary table of a two-dimensional joint distribution of maximum historical rival bids and updated valuations in accordance with one embodiment of the present invention.

FIG. 5 is a diagram of an exemplary matrix 500 of a two-dimensional joint distribution of maximum historical rival bids and updated valuations from bidder 3's point of view in accordance with one embodiment of the present invention. Matrix 500 comprises maximum historical rival bids 510 and updated valuations 520 for historical auctions 530. For example, in auction 4 of matrix 500, the maximum historical rival bid 510 is 23 and the updated valuation 520 is 18.

With reference to FIG. 4, at step 420 of process 240, a non-parametric estimation is performed on the two-column matrix (e.g. matrix 500 of FIG. 5) to determine the joint distribution. It should be appreciated that any technique of non-parametric estimation can be used. In one embodiment, the non-parametric estimation is carried out according to Equations 1 and 2.

$$\hat{H}_{B_i,v_i}(B, v) = \frac{1}{L_n h_G} \sum_{l=1}^{L_n} 1(B_{i,l} \leq B) K_G\left(\frac{v - v_{i,l}}{h_G}\right) \quad \text{Equation 1}$$

wherein B represents the first value, b represents the second value, i represents a particular bidder, l represents a particular auction of the plurality of auctions, $L_n$ represents the total number of auctions comprising n bidders, $h_G$ represents a first bandwidth, and $K_G$ represents a one-dimensional kernel. It should be appreciated that the first bandwidth can be selected using standard mathematical techniques and that the one-dimensional kernel can be selected from the standard set of non-parametric kernel functions.

$$\hat{h}_{B_i,v_i}(B, v) = \frac{1}{L_n h_g^2} \sum_{l=1}^{L_n} K_g\left(\frac{B - B_{i,l}}{h_g}, \frac{v - v_{i,l}}{h_g}\right) \quad \text{Equation 2}$$

wherein B represents the first value, b represents the second value, i represents a particular bidder, l represents a particular auction of the plurality of auctions, $L_n$ represents the total number of auctions comprising n bidders, $h_g$ represents a second bandwidth, and $K_g$ represents a two-dimensional kernel. It should be appreciated that the second bandwidth can be selected using standard mathematical techniques and that the two-dimensional kernel can be selected from the standard set of non-parametric kernel functions.

With reference to FIG. 1, at step 130, a density of the joint distribution is determined. In one embodiment, the density of the joint distribution is determined by determining the derivative of the joint distribution as determined above.

At step 140, the bid is determined based on the risk preference, the rate of change of the risk preference, the valuation, the joint distribution, and the density of the joint distribution. With reference to Equation 3, let $$H_i(\tilde{b}_i, \ldots, \tilde{b}_{i-1}, \tilde{v}_i, \tilde{b}_{i+1}, \ldots, \tilde{b}_n) = \text{Prob}(b_1 \leq \tilde{b}_1, \ldots, b_{i-1} 23 \tilde{b}_{i-1}, v_i = \tilde{v}_i, b_{i+1} \leq \tilde{b}_{i+1}, b_n \leq \tilde{b}_n) \quad \text{Equation 3}$$

It is assumed that bids are drawn from a bounded domain [b, $\bar{b}$] and $H_i(\tilde{b}_i, \ldots, \tilde{b}_{i-1}, \tilde{v}_i, \tilde{b}_{i+1}, \ldots, \tilde{b}_n)$ is differentiable with respect to all but $\tilde{b}_j$, $j \neq i$. With the joint probability function of Equation 3, the conditional distribution in the enumerator is given in Equation 4.

$$\text{Prob}(B_i < b_i, v_i) = \frac{H_i(b_i, \ldots, b_i, v_i, b_i, \ldots, b_i)}{H_i(\bar{b}, \ldots, \bar{b}, v_i, \bar{b}, \ldots, \bar{b})} \quad \text{Equation 4}$$

The derivative of equation 4 with respect to $b_i$ is given in Equation 5.

$$\frac{d\text{Prob}(B_i < b_i, v_i)}{db_i} = \frac{\sum_{j \neq i} \frac{\partial H_i}{\partial b_j} H_i(b_i, \ldots, b_i, v_i, b_i, \ldots, b_i)}{H_i(\bar{b}, \ldots, \bar{b}, v_i, \bar{b}, \ldots, \bar{b})} \quad \text{Equation 5}$$

Combining Equations 4 and 5, the relationship between the bidder's valuation and the optimal bid is given in Equation 6.

$$\frac{u_i(v_i - b_i^*)}{u_i'(v_i - b_i^*)} = \frac{H_{B_i,v_i}(b_i^*, v_i)}{h_{B_i,v_i}(b_i^*, v_i)} \quad \text{Equation 6}$$

In one embodiment, the bid is determined according to Equation 6, wherein i represents the bidder, $u_i$ comprises the risk preference of the bidder, $u_i'$ comprises the rate of change of the risk preference of the bidder, $v_i$ comprises the valuation for the auction of the bidder, $b_i^*$ comprises the bid of the bidder, $H_{B_i,v_i}(b_i^*, v_i)$ comprises the joint distribution, and $h_{B_i,v_i}(b_i^*, v_i)$ comprises the density of the joint distribution. All the elements of Equation 1 are known except for $b_i^*$. Equation 1 is solved for $b_i^*$, providing the bidder with an optimal bid to use for bidding in the auction.

Figure 6:
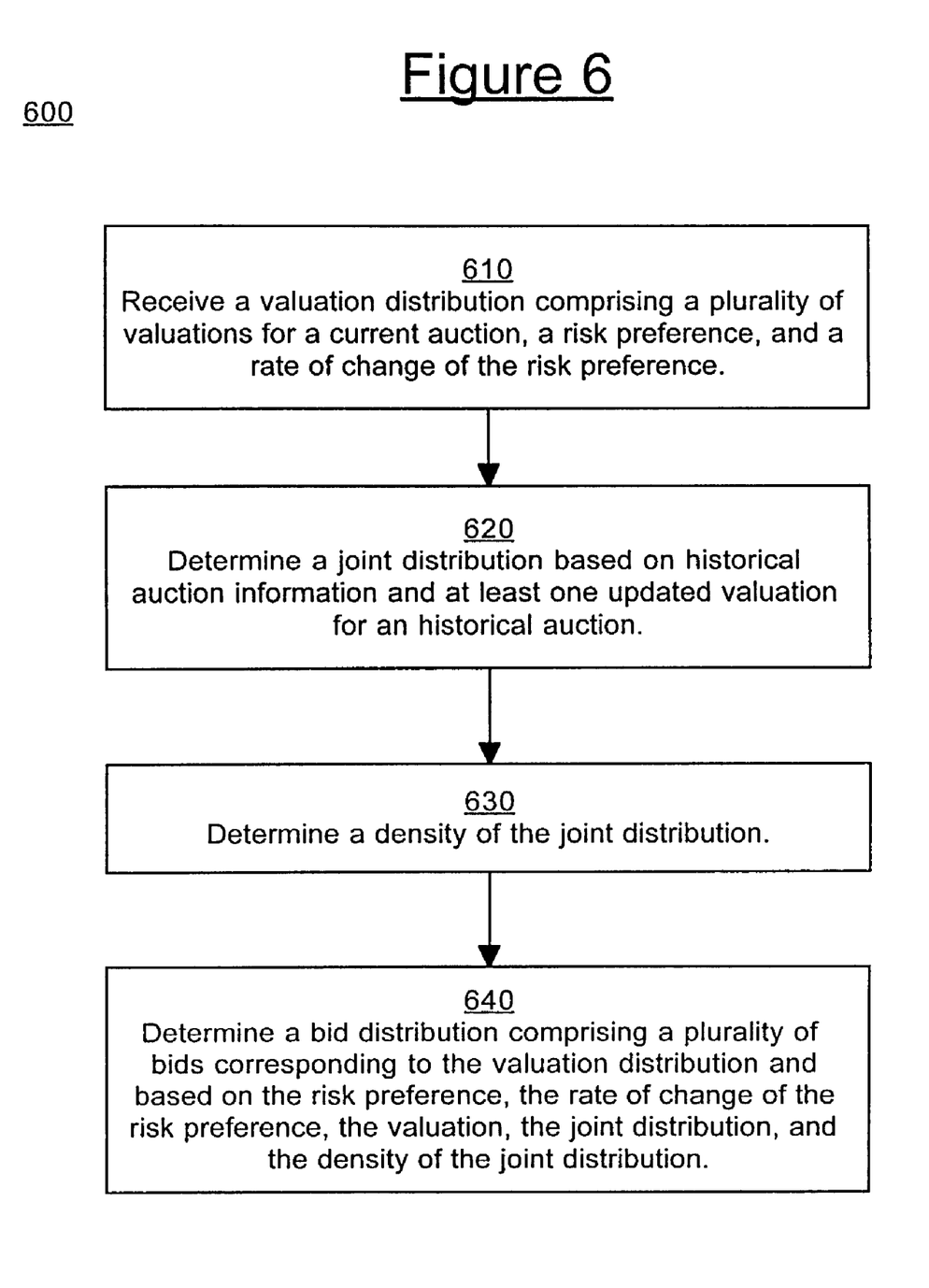
FIG. 6 is a flow chart illustrating steps in a process for determining a bid distribution for an auction in accordance with one embodiment of the present invention.

FIG. 6 is a flow chart illustrating steps in a process 600 for determining a bid distribution for an auction in accordance with one embodiment of the present invention. In one embodiment, process 600 is carried out by processors and electrical components under the control of computer readable and computer executable instructions. Although specific steps are disclosed in process 600, such steps are exemplary. That is, the embodiments of the present invention are well suited to performing various other steps or variations of the steps recited in FIG. 6.

At step 610, information pertaining to an auction and a bidder is received. In one embodiment, the auction is a sealed bid first price auction. In one embodiment, an updated valuation distribution for the auction is received, as well as a risk preference for the bidder and a rate of change of the risk preference. The updated valuation distribution comprises a plurality of updated valuations for the auction.

At step 620, a joint distribution is determined based on historical auction information the updated valuation distribution for an historical auction. It should be appreciated that the historical auctions of the historical auction information are for an item similar to the item of the auction. In one embodiment, process 120 of FIG. 2 is used to determine the joint distribution. At step 630, a density of the joint distribution is determined. In one embodiment, the density of the joint distribution is determined by determining the derivative of the joint distribution as determined above.

At step 640, a bid distribution comprising a plurality of bids is determined based on the risk preference, the rate of change of the risk preference, the valuation, the joint distribution, and the density of the joint distribution. In one embodiment, each bid of the bid distribution is determined according to Equation 1 as described above.

Figure 7:
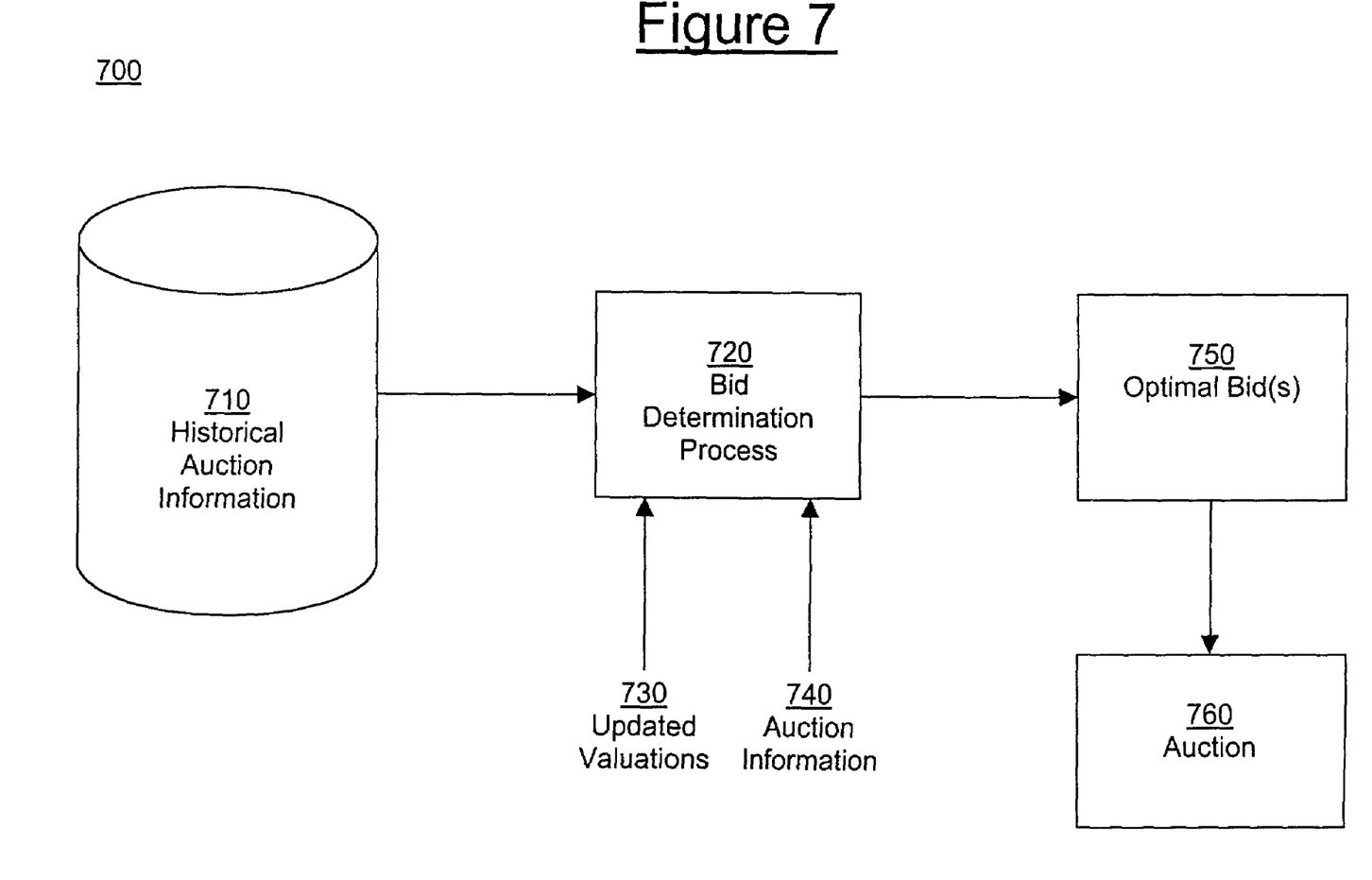
FIG. 7 is a data flow diagram illustrating a system for determining a bid for an auction in accordance with one embodiment of the present invention.

FIG. 7 is a data flow diagram 700 illustrating data flow in a process for determining a bid for an auction in accordance with one embodiment of the present invention. In one embodiment, the auction is a sealed bid first price auction. Historical auction information 710 is accessed. In one embodiment, historical auction information 710 comprises historical bid values for a plurality of historical auctions having a plurality of historical bidders. In one embodiment, historical auction information 710 is stored in a memory device of a computer system. In one embodiment, historical auction information 710 is stored in a database of a memory device of a computer system. It should be appreciated that historical auction information 710 can be stored in any format for storing data, and that the present invention is not limited to any one particular embodiment.

Historical auction information 710 is received at bid determination process 720. In one embodiment, historical auction information 710 is a matrix (e.g., matrix 300 of FIG. 3A) comprising historical bids for a plurality of historical auctions having a plurality of historical bidders. At bid determination process 720, the historical bid values of historical auction information 710 and updated valuations 730 for the historical bids are used to determine a joint distribution. The bid is determined based on the joint distribution, the density of the joint distribution, and auction information 740. In one embodiment, auction information 740 comprises a valuation for the auctioned item, a risk preference for the bidder, and a rate of change of the risk preference. In one embodiment, bid determination process 720 operates according to process 100 of FIG. 1. Optimal bid 750 provides a bidder with a bid to use when participating in the auction. In one embodiment, a distribution of optimal bids 750 is presented for corresponding valuations. Optimal bid 750 can be used to place a bid in auction 760.

Various embodiments of the present invention, a computer-implemented method for determining a bid for an auction, are thus described. While the present invention has been described in particular embodiments, it should be appreciated that the present invention should not be construed as limited by such embodiments, but rather construed according to the below claims.

What is claimed is:

1. A computer-implemented method for determining a bid for an auction, said method comprising:
  receiving, by a computer, a valuation for said auction, a risk preference, and a rate of change of said risk preference;
  determining, by the computer, a joint distribution based on historical auction information and at least one updated valuation for an historical auction;
  determining, by the computer, a density of said joint distribution; and
  determining, by the computer, said bid based on said risk preference, said rate of change of said risk preference, said valuation, said joint distribution, and said density of said joint distribution.

2. The method as recited in claim 1 wherein said determining said joint distribution comprises:
  accessing said historical auction information for at least one historical auction, said historical auction information comprising a description of said historical auction and historical bids for said historical auction;
  receiving said updated valuation for at least one said historical auction;
  determining the maximum historical rival bid of said historical bids for at least one said historical auction; and
  performing a statistical estimation of said updated valuation and said maximum historical rival bid to determine said joint distribution.

3. The method as recited in claim 1 wherein said auction is a sealed bid first price auction.

4. The method as recited in claim 2 wherein said performing said statistical estimation comprises
  generating a two-column matrix wherein a row represents one said historical auction, a first column comprises said maximum historical rival bid and a second column comprises said updated valuation; and
  performing a non-parametric estimation on said two-column matrix.

5. The method as recited in claim 1 wherein said density of said joint distribution is determined by determining the derivative of said joint distribution.

6. A computer-implemented method for determining a bid for an auction, said method comprising:
  receiving, by a computer, a valuation for said auction, a risk preference, and a rate of change of said risk preference;
  determining, by the computer, a joint distribution based on historical auction information and at least one updated valuation for an historical auction;
  determining, by the computer, a density of said joint distribution; and
  determining, by the computer, said bid based on said risk preference, said rate of change of said risk preference, said valuation, said joint distribution, and said density of said joint distribution,
  wherein said bid $b_i^*$ is determined according to $$\frac{u_i(v_i - b_i^*)}{u_i'(v_i - b_i^*)} = \frac{H_{B_i,v_i}(b_i^*, v_i)}{h_{B_i,v_i}(b_i^*, v_i)};$$

wherein said $u_i$ comprises said risk preference of a bidder i;
  wherein said $u_i'$ comprises said rate of change of said risk preference of said bidder i;
  wherein said $v_i$ comprises said valuation for said auction of said bidder i;
  wherein said $b_i^*$ comprises said bid of said bidder i;
  wherein said $H_{B_i,v_i}(b_i^*, v_i)$ comprises said joint distribution; and
  wherein said $h_{B_i,v_i}(b_i^*, v_i)$ comprises said density of said joint distribution.

7. The method as recited in claim 1 wherein said bid is an optimal bid.

8. The method as recited in claim 2 further comprising:
  receiving a valuation distribution comprising a plurality of said valuations for said auction; and determining a bid distribution comprising a plurality of said bids corresponding to said valuation distribution.

9. A non-transitory computer-readable medium having computer-readable program code embodied therein for causing a computer system to perform a method for determining a bid for an auction, said method comprising:
receiving a valuation for said auction, a risk preference for a bidder, and a rate of change of said risk preference for said bidder;
determining a joint distribution based on historical auction information and a plurality of updated valuations for a plurality of historical auctions;
determining a density of said joint distribution; and
determining said bid based on said risk preference, said rate of change of said risk preference, said valuation, said joint distribution, and said density of said joint distribution.

10. The computer-readable medium as recited in claim 9 wherein said determining said joint distribution comprises:
accessing said historical auction information for a plurality of historical auctions, said historical auction information comprising a description of a said historical auction and historical bids for said historical auction;
receiving said plurality of said updated valuations for said plurality of historical auctions;
determining a plurality of maximum historical rival bids of said historical bids for said plurality of said historical auctions; and
performing a statistical estimation of said plurality of said updated valuations and said plurality of said maximum historical rival bids to determine said joint distribution.

11. The computer-readable medium as recited in claim 10 wherein said performing said statistical estimation comprises:
generating a two-column matrix wherein a row represents one historical auction of said plurality of historical auctions, a first column comprises said plurality of said maximum historical rival bids and a second column comprises said plurality of said updated valuations; and
performing a non-parametric estimation on said two-column matrix.

12. The computer-readable medium as recited in claim 9 wherein said density of said joint distribution is determined by determining the derivative of said joint distribution.

13. A non-transitory computer-readable medium having computer-readable program code embodied therein for causing a computer system to perform a method for determining a bid for an auction, said method comprising:
receiving a valuation for said auction, a risk preference for a bidder, and a rate of change of said risk preference for said bidder;
determining a joint distribution based on historical auction information and a plurality of updated valuations for a plurality of historical auctions;
determining a density of said joint distribution; and
determining said bid based on said risk preference, said rate of change of said risk preference, said valuation, said joint distribution, and said density of said joint distribution,
wherein said bid $b_i^*$ is determined according to $$\frac{u_i(v_i - b_i^*)}{u_i'(v_i - b_i^*)} = \frac{H_{B_i,v_i}(b_i^*, v_i)}{h_{B_i,v_i}(b_i^*, v_i)};$$

wherein said $u_i$ comprises said risk preference of a bidder i;
wherein said $u_i'$ comprises said rate of change of said risk preference of said bidder i;
wherein said $v_i$ comprises said valuation for said auction of said bidder i;
wherein said $b_i^*$ comprises said bid of said bidder i;
wherein said $H_{B_i,v_i}(b_i^*, v_i)$ comprises said joint distribution; and
wherein said $h_{B_i,v_i}(b_i^*, v_i)$ comprises said density of said joint distribution.

14. The computer-readable medium as recited in claim 9 wherein said bid is an optimal bid.

15. The computer-readable medium as recited in claim 10 further comprising:
receiving a valuation distribution comprising a plurality of said valuations for said auction; and
determining a bid distribution comprising a plurality of said bids corresponding to said valuation distribution.

16. The computer-readable medium as recited in claim 9 wherein said auction is a sealed bid first price auction.

17. A computer-implemented method for determining risk preference associated with a bid, said method comprising:
receiving, by a computer, a valuation for said auction and a bid for said auction;
determining, by the computer, a joint distribution based on historical auction information and at least one updated valuation for an historical auction;
determining, by the computer, a density of said joint distribution; and
determining, by the computer, said risk preference based on said valuation, said bid, said joint distribution, and said density of said joint distribution.

18. The method as recited in claim 17 wherein said determining said joint distribution comprises:
accessing said historical auction information for at least one historical auction, said historical auction information comprising a description of said historical auction and historical bids for said historical auction;
receiving said updated valuation for at least one said historical auction;
determining the maximum historical rival bid of said historical bids for at least one said historical auction; and
performing a statistical estimation of said updated valuation and said maximum historical rival bid to determine said joint distribution.

19. The method as recited in claim 17 wherein said auction is a sealed bid first price auction.

20. The method as recited in claim 18 wherein said performing said statistical estimation comprises
generating a two-column matrix wherein a row represents one said historical auction, a first column comprises said maximum historical rival bid and a second column comprises said updated valuation; and
performing a non-parametric estimation on said two-column matrix.

21. The method as recited in claim 17 wherein said density of said joint distribution is determined by determining the derivative of said joint distribution.

22. A computer-implemented method for determining risk preference associated with a bid, said method comprising:
receiving, by a computer, a valuation for said auction and a bid for said auction;
determining, by the computer, a joint distribution based on historical auction information and at least one updated valuation for an historical auction;
determining, by the computer, a density of said joint distribution; and determining, by the computer, said risk preference based on said valuation, said bid, said joint distribution, and said density of said joint distribution, wherein said risk preference $u_i$ is determined according to $$\frac{u_i(v_i - b_i^*)}{u_i'(v_i - b_i^*)} = \frac{H_{B_i,v_i}(b_i^*, v_i)}{h_{B_i,v_i}(b_i^*, v_i)};$$

wherein said $u_i$ comprises said risk preference of a bidder i;

wherein said $u_i'$ comprises said rate of change of said risk preference of said bidder i;

wherein said $v_i$ comprises said valuation for said auction of said bidder i;

wherein said $b_i^*$ comprises said bid of said bidder i;

wherein said $H_{B_i,v_i}(b_i^*, v_i)$ comprises said joint distribution; and wherein said $h_{B_i,v_i}(b_i^*, v_i)$ comprises said density of said joint distribution.

* * * * *